United States Patent
Gao et al.

(10) Patent No.: US 9,414,188 B2
(45) Date of Patent: Aug. 9, 2016

(54) LOCATION ASSISTANCE INFORMATION DETERMINATION

(71) Applicant: QUALCOMM Incorporated, San Diego, CA (US)

(72) Inventors: Weihua Gao, San Jose, CA (US); Benjamin A. Werner, San Carlos, CA (US); Guttorm R. Opshaug, Redwood City, CA (US); Sai Pradeep Venkatraman, Santa Clara, CA (US); Mayur N. Shah, Mill Creek, WA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/490,059

(22) Filed: Sep. 18, 2014

(65) Prior Publication Data

US 2016/0088429 A1    Mar. 24, 2016

(51) Int. Cl.
*H04W 4/02* (2009.01)
*H04W 64/00* (2009.01)
*H04W 84/04* (2009.01)

(52) U.S. Cl.
CPC .............. *H04W 4/02* (2013.01); *H04W 64/003* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 7,940,740 B2 | 5/2011 | Krishnamurthy et al. | |
| 8,412,229 B1* | 4/2013 | Bonn | H04W 4/003 370/310 |
| 2010/0016022 A1* | 1/2010 | Liu | H04W 48/08 455/561 |
| 2010/0167728 A1* | 7/2010 | Venkitaraman | H04W 36/04 455/434 |
| 2010/0298008 A1* | 11/2010 | Burroughs | H04W 64/00 455/456.1 |
| 2010/0331009 A1 | 12/2010 | Krishnamurthy et al. | |
| 2011/0117932 A1* | 5/2011 | Breitbach | G01S 5/0205 455/456.1 |
| 2012/0020323 A1 | 1/2012 | Noh et al. | |
| 2012/0046047 A1 | 2/2012 | Popovic et al. | |
| 2013/0102325 A1 | 4/2013 | Flanangan | |

FOREIGN PATENT DOCUMENTS

| | | |
|---|---|---|
| EP | 2469896 A1 | 6/2012 |
| WO | 2012099514 A1 | 7/2012 |

OTHER PUBLICATIONS

3GPP2 S.R0139-0 Version 1.0 Femtocell Systems Overview for cdma2000 Wireless Communication Systems, dated Jul. 28, 2011 by 3GPP2.*
International Search Report and Written Opinion—PCT/US2015/049080—ISA/EPO—Dec. 7, 2015, 10 pgs.

* cited by examiner

*Primary Examiner* — Daniel Lai
(74) *Attorney, Agent, or Firm* — Hunter Clark PLLC

(57) ABSTRACT

Methods and apparatus are described for providing location assistance information to a mobile device. An example of a method for providing location assistance information to the mobile device by a femto base station includes receiving a macro base station signal during a monitoring time period during which the femto base station is substantially stationary, obtaining location assistance information, the location assistance information being based, at least in part, on the received macro base station signal, and transmitting the location assistance information to the mobile device.

26 Claims, 7 Drawing Sheets

LOCATION ASSISTANCE INFORMATION DETERMINATION

BACKGROUND

Location assistance information determined from macro base station signals can improve positioning accuracy for a mobile device. However, networks are subject to change and reconfiguration. Therefore, it is useful to update and provide timely information on the macro base station signals. Mobile device crowdsourcing is often used for this purpose. However, typical operational features of mobile devices may limit the accuracy of the information. Further, using mobile devices for this purpose may adversely impact the operation of the mobile device.

SUMMARY

An example of a method of providing location assistance information to a mobile device by a femto base station according to the disclosure may include receiving a macro base station signal during a monitoring time period during which the femto base station is substantially stationary, obtaining location assistance information, the location assistance information being based, at least in part, on the received macro base station signal, and transmitting the location assistance information to the mobile device.

Implementations of such a method may include one or more of the following features. The location assistance information may include at least one of a multipath effect determination or a time-of-transmission offset. Signal timing information used in at least one of the multipath effect determination or the time-of-transmission offset may be adjusted based on a femto base station group delay offset value, the femto base station group delay offset value being a group delay difference between signal receiver chains. Receiving the macro base station signal may include receiving a location reference signal (LRS) including at least one of a positioning reference signal (PRS) or a cell reference signal (CRS). The method may include scanning over a plurality of frequencies during the monitoring time period. The location assistance information may include one or more of bandwidth, configuration index, muting pattern, number of frames, macro base station cell identifier, macro base station signal power, duty cycle, or frequency list. Receiving the LRS may include receiving a first LRS and a second LRS, combining the first LRS and the second LRS, and obtaining a set of reference signal parameters from the combined LRS. The first LRS may be a first LRS fragment and the second LRS may be a second LRS fragment. Obtaining the location assistance information may include obtaining statistical indicators associated with the location assistance information. Obtaining the location assistance information may include providing femto base station information to a server and receiving the location assistance information, the location assistance information being based at least in part on the femto base station information. Obtaining the location assistance information may include determining the location assistance information at the femto base station.

An example of a femto base station for providing location assistance information to a mobile device according to the disclosure may include a transceiver configured to receive a macro base station signal, a memory, and a processor communicatively coupled to the transceiver and the memory and configured to obtain the location assistance information, the location assistance information being based, at least in part, on the received macro base station signal, the transceiver being further configured to transmit the location assistance information to the mobile device and the femto base station being substantially stationary.

Implementations of such a femto base station may include one or more of the following features. The location assistance information may include at least one of a multipath effect determination or a time-of-transmission offset. Signal timing information used in at least one of the multipath effect determination or the time-of-transmission offset may be adjusted based on a femto base station group delay offset value, the femto base station group delay offset value being a group delay difference between signal receiver chains. The transceiver may be further configured to receive a location reference signal (LRS) including at least one of a positioning reference signal (PRS) or a cell reference signal (CRS). The transceiver may be further configured to scan over a plurality of frequencies during a monitoring time period during which the femto base station is substantially stationary. The location assistance information may include one or more of bandwidth, configuration index, muting pattern, number of frames, macro base station cell identifier, macro base station signal power, duty cycle, or frequency list. The transceiver may be further configured to receive a first LRS and a second LRS, combine the first LRS and the second LRS, and obtain a set of reference signal parameters from the combined first LRS. The first LRS may be a first LRS fragment and the second LRS may be a second LRS fragment. The processor may be further configured to obtain statistical indicators associated with the location assistance information. The processor may be further configured to provide femto base station information to a server and to receive the location assistance information, the location assistance information being based at least in part on the femto base station information. The processor may be further configured to determine the location assistance information at the femto base station.

An example of a method of providing location assistance information from a server to a mobile device according to the disclosure may include receiving femto base station information from at least one femto base station, obtaining the location assistance information, the location assistance information being based at least on part on the received femto base station information, identifying the mobile device, selecting the location assistance information corresponding to the mobile device, and providing the location assistance information to the mobile device.

Implementations of such a method may include one or more of the following features. The femto base station information may include one or more of femto base station location information, received signal phase information, received signal power information, a signal time-of-arrival, a signal time-of transmission, a signal time stamp, a reference SPS time standard, or a femto base station group delay offset value. Obtaining the location assistance information may include determining the location assistance information at the server. Obtaining the location assistance information may include determining predicted location assistance information. The method may further include providing the predicted location assistance information to the mobile device. The location assistance information may include at least one of a multipath effect determination or a time-of-transmission offset. The location assistance information may include one or more of bandwidth, configuration index, muting pattern, number of frames, macro base station cell identifier, macro base station signal power, duty cycle, or frequency list.

An example of a server for providing location assistance information to a mobile device according to the disclosure may include a memory, a network interface, and one or more processors coupled to the memory and to the network interface and configured to receive femto base station information from at least one femto base station via the network interface, obtain the location assistance information, the location assistance information being based at least in part on the received femto base station information, identify the mobile device, select location assistance information corresponding to the mobile device, and provide the location assistance information to the mobile device, the location assistance information being based at least in part on the received femto base station information.

Implementations of such a server may include one or more of the following features. The femto base station information may include one or more of femto base station location information, received signal phase information, received signal power information, a signal time-of-arrival, a signal time-of transmission, a signal time stamp, a reference SPS time standard, or a femto base station group delay offset value. Obtaining the location assistance information may include determining the location assistance information at the server. The one or more processors may be further configured to determine predicted location assistance information and provide the predicted location assistance information to the mobile device. The location assistance information may include at least one of a multipath effect determination or a time-of-transmission offset. The location assistance information may include one or more of bandwidth, configuration index, muting pattern, number of frames, macro base station cell identifier, macro base station signal power, duty cycle, or frequency list.

Items and/or techniques described herein may provide one or more of the following capabilities. Without wireless communication network assistance, a femto base station can scan for and receive a location reference signal (LRS) or other signal transmitted by a macro base station. The femto base station can determine location assistance information based on macro base station signals received at the femto base station. The femto base station can store the location assistance information and/or send the location assistance information to a server and/or a mobile device. The femto base station remains stationary during typical operation, reducing receiver position errors and enabling the femto base station to collect the macro base station signals received by the femto base station over a relatively long period of time (e.g., as compared to a transmission interval of the LRS). Location assistance information errors can be reduced by determining location assistance information using a femto base station group delay offset value. A server can generate predicted location assistance information for mobile devices located outside of a femtocell based on information collected and provided by one or more femto base stations. Other capabilities may be provided and not every implementation according to the disclosure must provide any, let alone all, of the capabilities discussed. Further it may be possible for an effect noted above to be achieved by means other than that noted and a noted item/technique may not necessarily yield the noted effect.

BRIEF DESCRIPTIONS OF THE DRAWINGS

DETAILED DESCRIPTION

Techniques are provided for determining location assistance information by a femto base station and providing the location assistance information to a mobile device. For example, a macro base station signal from a macro base station is received at the femto base station during a monitoring time period. The femto base station is communicatively coupled to a core network. At least during the monitoring time period, the femto base station is substantially stationary. Further, a power capacity of the femto base station is not limited by a battery capacity at least during the monitoring time period (e.g., the femto base station receives power via a wired power connection to an alternating current (AC) power outlet). Location assistance information based on the macro base station signal received at the femto base station is determined by the femto base station. The location assistance information includes reference signal parameters, a multipath effect determination, and a time-of-transmission offset. The location assistance information is determined based at least in part on a stored femto base station group delay offset value. The location assistance information is provided by the femto base station to a mobile device. Femto base station information from the femto base station including at least one of the location assistance information, received signal information, and timing information is provided by the femto base station to a positioning server. The location assistance information received by the positioning server from the femto base station is provided to the mobile device. Location assistance information is determined at the positioning server based at least in part on the signal information and the timing information received from the femto base station. Predicted location assistance information is determined at the positioning server. The location assistance information and/or the predicted location assistance information determined at the positioning server are provided to the mobile device. The techniques discussed below are examples and not limiting as other implementations in accordance with the disclosure are possible. Individual ones of the described techniques may be implemented as a method, apparatus, or system and can be embodied in computer-readable media. As used herein, the terms location and position are synonymous and interchangeable.

Figure 1A:
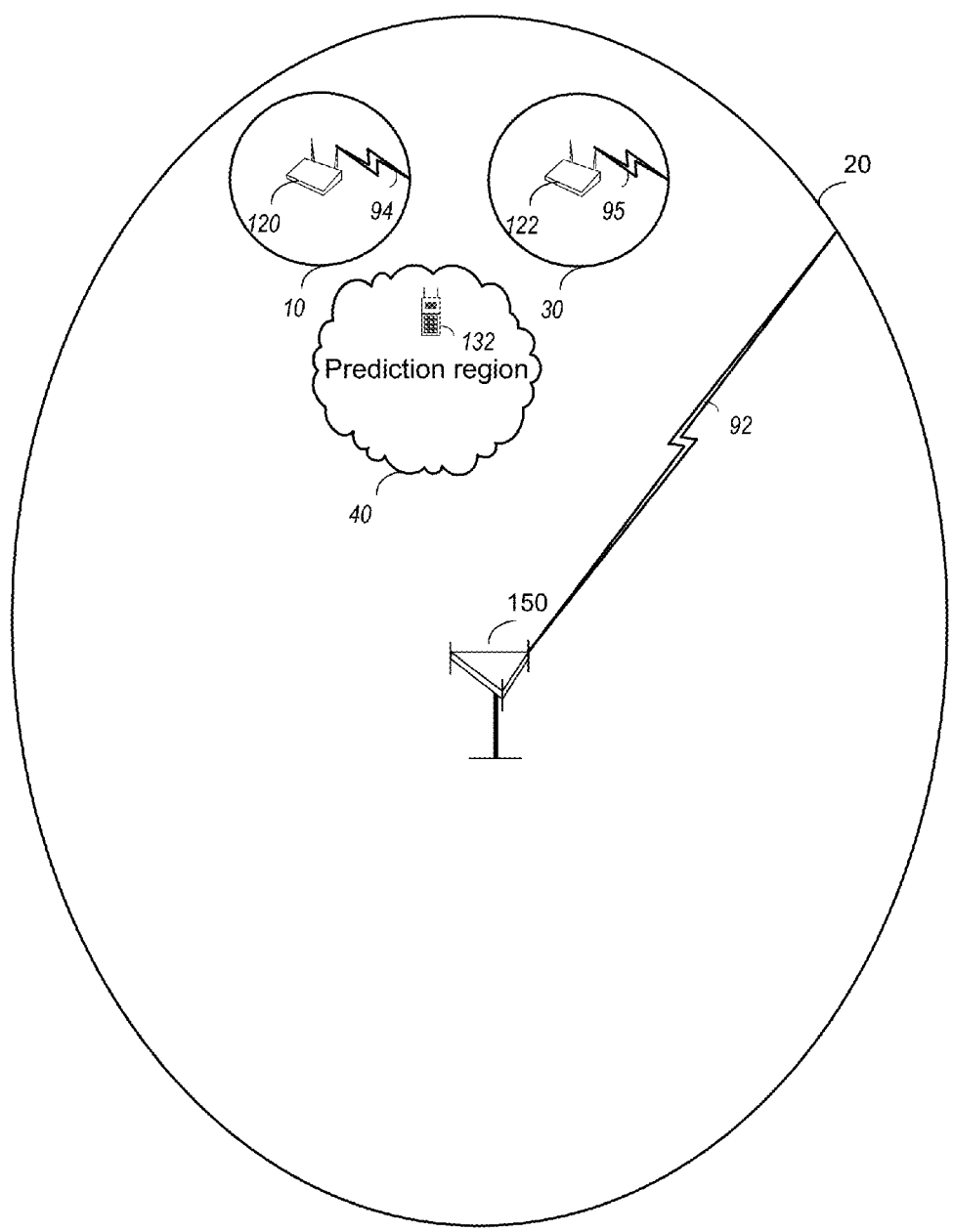
FIG. 1A is a schematic diagram of a femtocell and a macrocell.

Location assistance information determined based on a macro base station signal received by a femto base station can improve range-based terrestrial positioning accuracy for a mobile device in a wireless communication network. The accuracy of the range-based terrestrial positioning may be reduced due to errors associated with a determined signal time-of-flight. The signal time-of-flight indicates a signal path length (e.g., the distance between the signal transmitter and the signal receiver) used in the range-based terrestrial positioning. These signal time-of-flight errors may be introduced by a multipath effect and/or a time-of-transmission offset. Determination of the multipath effect and the time-of-transmission offset may reduce positioning uncertainty. The multipath effect results from signal path length differences due to scattering of the macro base station signals by terrain features (e.g., mountains, hills, valleys, water, and buildings) in a macrocell. Referring to FIG. 1A, the macrocell (e.g., macrocell 20) is a macro transmission coverage area associated with macro base station signals 92 transmitted by a macro base station 150. The macrocell 20 is typically an area with a radius from the macro base station between about 0.5 kilometers and about 5 kilometers, depending on operating conditions such as macro base station transmission power, the terrain features, etc. The time-of-transmission offset is a timing discrepancy between a macro base station's forward link transmission time and a reference time scale produced by signal processing and transmission hardware components in the macro base station (e.g., antennas, timing strobe components, etc.).

The macro base station signal 92 may be a location reference signal (LRS). The LRS is a forward link pilot signal coded and transmitted by a wireless network macro base station specifically, but not exclusively, for use in location services and is a signal that is known a priori by the transmitter and the receiver. The forward link, also referred to as a downlink, describes a communications link from the macro base station to the mobile device, the femto base station, or other receiver. The LRS may include a positioning reference signal (PRS) (e.g., Long Term Evolution PRS ((LTE) PRS)) and/or a cell reference signal (CRS) (e.g., (LTE) CRS). The LRS is transmitted from the macro base station at particular frequencies and times according to a configuration pattern. Additionally or alternatively, the macro base station signal 92 may be any forward link macro base station signal that may (or may not) be coded and/or transmitted by the macro base station specifically, but not exclusively, for use in location services.

The location assistance information may include reference signal parameters indicated by the LRS including one or more of bandwidth, configuration index, muting pattern, number of frames, macro base station cell identifier, macro base station signal power, duty cycle, and frequency list (i.e., available carrier frequencies). The location assistance information may further include the multipath effect determination and/or a time-of-transmission offset, a received signal strength indicator (RSSI) (e.g., macro base station signal strength), other signal timing information, and/or other indicators of transmission channel conditions.

Location assistance information may be determined using crowdsourcing data from multiple mobile devices operating in one or more macrocells. Typical operating conditions of the mobile device can contribute to errors in the location assistance information as determined from mobile device crowdsourcing data. For example, voice calls, changes in ambient temperature due to mobile device location changes, and power cycles (e.g., due to battery power fluctuations and powering the mobile device on and off) can contribute to mobile device clock instability. As another example, mobile devices often move large distances (e.g., within the area of the macrocell 20 or between macrocells). Terrain feature variations over these distances can cause variations in signal scattering which contribute to multipath effect variations. Further, signals from multiple macro base stations are associated with varying time-of-transmission offsets. Additionally, in order to extend mobile device battery life and to facilitate spatial mobility of the mobile device, the wireless network typically provides the particular frequency and time for reception of the LRS to the mobile device via an assistance signal from the wireless communication network. In this manner, the mobile device can find and receive the LRS at the particular frequency and time without adversely impacting battery life by scanning over multiple frequencies for a long period of time from a fixed location. However, in particular indoor and/or urban locations, signals from the wireless network macro base station are unusable by a mobile device due to, for example, signal shadowing caused by absorption, reflection, and scattering of these signals. In these locations, the mobile device may not receive the assistance signal and/or other macro base station signals indicating the frequency and the time of reception of the LRS. For the mobile device, scanning over multiple frequencies for a long period of time from a fixed location, may reduce battery life and may adversely affect other operation of the mobile device such as voice calls, data transfer, positioning, etc.

Figure 1B:
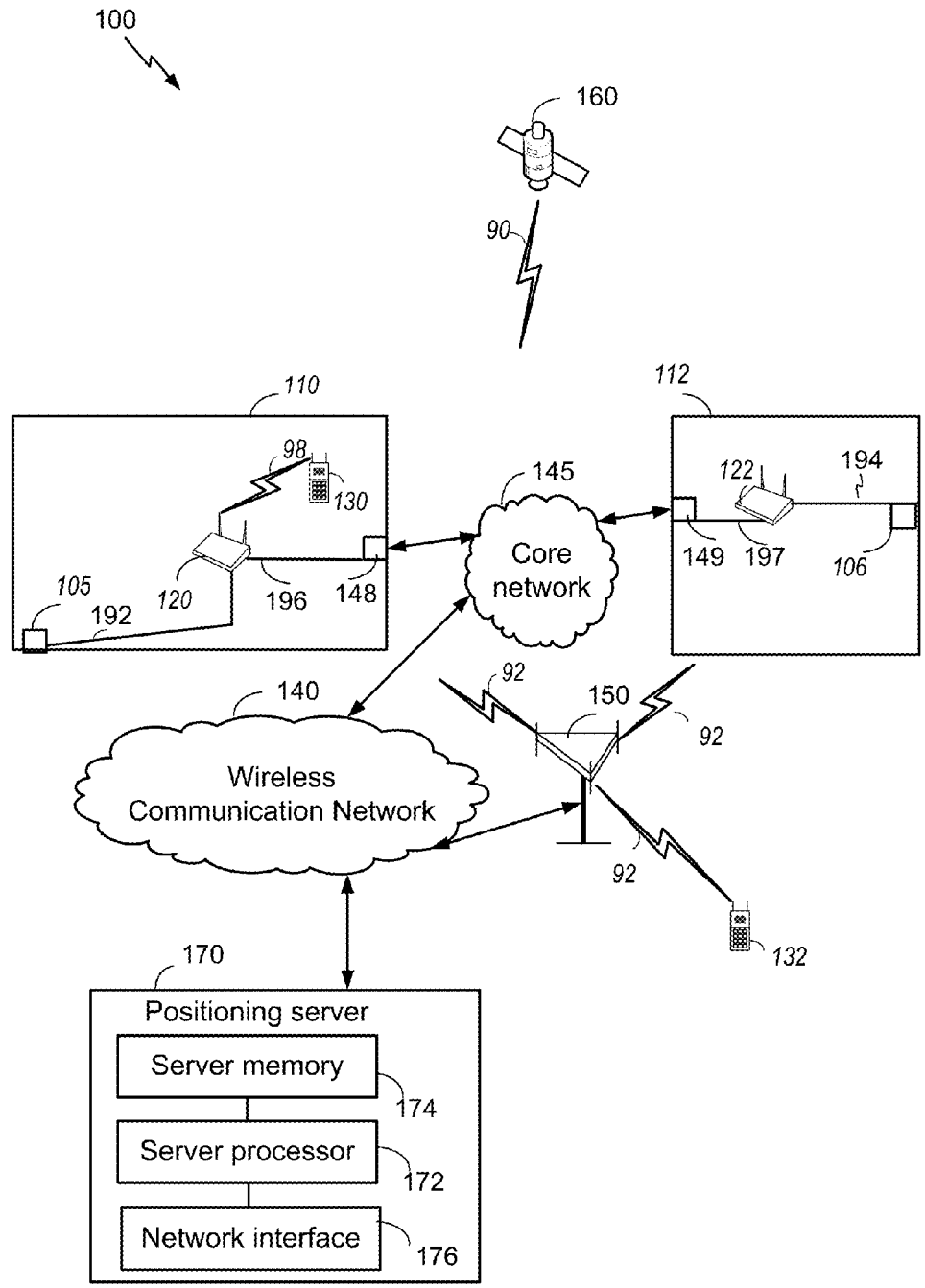
FIG. 1B is a schematic diagram of a system for providing location assistance information from a femto base station to a mobile device.

Referring to FIG. 1B, an example system 100 for providing location assistance information from a femto base station to a mobile device includes a femto base station 120, a femto base station 122, a mobile device 130, a mobile device 132, a macro base station 150, a positioning server 170, a wireless communication network 140, a core network 145, and a Satellite Positioning System (SPS) satellite 160. The quantity of each system component in FIG. 1B is an example only and other quantities of each, or any, component could be used. For example, more mobile devices than the two mobile devices 130, 132 may be included in the system 100. The femto base station 120 and the mobile device 130 are disposed in a structure 110 (e.g., a first structure). The femto base station 122 is disposed in a structure 112 (e.g., a second structure). The femto base stations 120, 122 may also be referred to as, for example, a Home Node B (HNB), a Home evolved NodeB (eNodeB), a femto access point, etc. Each structure 110, 112 may be, for example, a home, an office building, or another structure compatible with femto base station installation. Although shown as two distinct structures in FIG. 1B, the structures 110 and 112 may be the same structure or connected structures.

The SPS satellite 160 includes suitable logic, circuitry and code to generate and send radio-frequency (RF) SPS signals 90 that may be received at the femto base stations 120, 122 and/or the mobile devices 130, 132 for use in determining an SPS-based position of the femto base stations 120, 122 and/or the mobile devices 130, 132. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system (s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. In some embodiments, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system (s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 90 may include SPS, SPS-like, and/or other signals associated with such one or more SPS.

The wireless communication network 140 supports any of various air interfaces, for example, the wireless communication network 140 may be any of various wireless communications networks including a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, etc. A CDMA network may implement one or more radio access technologies (RATs) such as CDMA2000, Wideband-CDMA (W-CDMA), Time Division Synchronous Code Division Multiple Access (TD-SCDMA), to name just a few radio technologies. Here, CDMA2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. Wireless communication networks may include so-called next generation technologies (e.g., "4G"), such as, for example, Long Term Evolution (LTE), Advanced LTE, WiMax, Ultra Mobile Broadband (UMB), and/or the like.

The wireless communication network 140 may be communicatively coupled to the core network 145, the macro base station 150, and the positioning server 170. Although shown separately, the core network 145 may be a portion of the wireless communication network 140. The core network may include a mobile switching center and a packet data network (e.g., an Internet Protocol (IP) network referred to herein as the Internet). The macro base station 150 may also be referred to as, for example, a NodeB or an eNB (e.g., in the context of an LTE wireless network), etc. The macro base station 150 can transmit the macro base station signal 92 over the macrocell 20, as discussed above. The transmitted macro base station signal 92 may include the LRS and may be received at the femto base stations 120, 122 and/or the mobile devices 130, 132.

The positioning server 170 includes a server processor 172, a server memory 174, and a network interface 176. While only one of each of these components is shown in FIG. 1B, more than one of either of these components could be used. The functionality of the positioning server 170 is described below in the discussion of FIG. 4. The server processor 172 can be an intelligent hardware device, e.g., a central processing unit (CPU) such as those made by ARM®, INTEL® Corporation, or AMD®, a microcontroller, an application specific integrated circuit (ASIC), a general-purpose processor, a digital signal processor (DSP), a field programmable gate array (FPGA) or other programmable logic device, discrete gate or transistor logic, discrete hardware components, or any combination thereof designed to perform the functions described herein. A general-purpose processor may be a microprocessor, or in the alternative, any conventional processor, controller, microcontroller, or state machine. A processor may also be implemented as a combination of computing devices, e.g., a combination of DSP and a microprocessor, a plurality of microprocessors, one or more microprocessors in conjunction with a DSP core, or any other such configuration. The server processor 172 may include multiple separate physical entities that can be distributed in the positioning server 170. The server memory 174 refers generally to any type of computer storage medium, including but not limited to RAM, ROM, FLASH, disc drives, etc. The server memory 174 may be long term, short term, or other memory associated with the positioning server 170 and is not to be limited to any particular type of memory or number of memories, or type of media upon which memory is stored. The server memory 174 is a non-transitory, processor-readable storage medium that stores processor-readable, processor-executable software code containing instructions that are configured to, when executed, cause the server processor 172 to perform various functions described herein (although the description may refer only to the server processor 172 performing the functions). Alternatively, the software code may not be directly executable by the server processor 172 but configured to cause the server processor 172, e.g., when compiled and executed, to perform the functions. The functions of the positioning server 170 may not be limited to positioning functions and the positioning server 170 may be the same as, or incorporated in, another wireless network server (not shown). The network interface 176 is coupled to the server processor 172. The network interface 176 is configured to send and receive data via the wireless communication network 140 and/or the core network 145.

The femto base station 120, (e.g., a first femto base station), can be a small base station installed in the structure 110. The femto base station 120 is configured to receive the SPS satellite signals 90 (e.g., from the SPS satellite 160) and the macro base station signals 92 (e.g., from the macro base station 150). The femto base station 120 supports any of the various air interfaces described above with regard to the wireless communication network 140. The femto base station 120 is preferably installed at a location within the structure 110 conducive to reception of SPS satellite signals 90 and macro base station signals 92. For example, the femto base station may be installed near a window or connected to a roof antenna. During typical operation, the location of the femto base station 120 may not change for long periods of time especially as compared to the mobile device 130. The femto base station 120 may be configured to receive power from an AC power source (not shown) via a wired connection 192 to a first AC power outlet 105 (e.g., a wall outlet, a power strip outlet, an extension cord outlet, etc.) and operation of the femto base station 120 may not depend on or be limited by a battery capacity. The femto base station 120 may also receive power via a DC power source, an inductive power transfer device, etc. The femto base station 120 is further configured to communicate bi-directionally with the mobile device 130 via wireless signals 98 (i.e., signals transmitted by the femto base station 120 and/or by the mobile device 130). The femto base station 120 may be communicatively coupled to the Internet via a wired connection 196 to a first computer network access device 148 (e.g., a router and/or cable modem) communicatively coupled to the core network 145. The connection 196 may also be a wireless connection between the femto base station 120 and the access device 148. The femto base station 120 may communicate with the wireless communication network 140 via the core network 145.

Referring again to FIG. 1A, in contrast to the macrocell 20 associated with the macro base station 150, the femto base station 120 is associated with a relatively small femtocell 10. The femtocell 10 (also referred to as a first femtocell or first femto transmission coverage area) is a femto transmission coverage area associated with femto base station signals 94 transmitted by the femto base station 120. Similarly, the femtocell 30 (also referred to as a second femtocell or second femto transmission coverage area) is a femto transmission coverage area associated with femto base station signals 95 transmitted by the femto base station 122. For example, the femtocell 10, 30 may be an area extending between about 50 meters and about 200 meters from the femto base station 120, e.g., with the size and shape of the area depending upon femto base station operating conditions such as transmission power and upon characteristics of the structure 110 (e.g., quantity, location, shape, and material of walls, furniture, doors, windows, occupants, etc.). A boundary (e.g., a circumference or perimeter) of the femtocell 10 may be determined by a threshold signal power. For example, a signal power may be calculated as a function of a transmission power of the femto base station 120 and a distance away from the femto base station 120. The boundary of the femtocell 10 may be where the calculated signal power is equal to the threshold signal power. The femtocell 10 for the femto base station 120 may include all or a portion of the structure 110 shown in FIG. 1B. The femtocell 10 may be associated with one macrocell 20.

Referring again to FIG. 1B, the femto base station 122, (e.g., a second femto base station), may be structurally and functionally similar to the femto base station 120. The femto base station 122 may be configured to receive power from the AC power source (not shown) via a wired connection 194 (e.g., a second wired connection) to an AC power outlet 106 (e.g., a second AC power outlet). The femto base station 122 may also receive power via a DC power source, an inductive power transfer device, etc. The femto base station 122 may be associated with a second femtocell. The femto base station 122 may be communicatively coupled to the Internet via a wired connection 197 to a second computer network access device 149 (e.g., a router and/or cable modem) communicatively coupled to the core network 145. The connection 197 may also be a wireless connection between the femto base station 122 and the access device 149. The femto base station 122 may communicate with the wireless communication network 140 via the core network 145.

The second femtocell may be discrete from the first femtocell or may overlap the first femtocell fully or in part. The second femtocell may include all or a portion of the structure 112 and may (or may not) be associated with the same macrocell as the first femto base station.

The mobile device 130, which may be a first mobile device, is configured to communicate bi-directionally with the femto base station 120 and the macro base station 150 via wireless signals and to receive SPS signals 90 from the SPS satellite 160. In locations within the structure 110 at which direct wireless communication between the mobile device 130 and the macro base station 150 is unusable and/or unavailable, the mobile device 130 may communicate with the wireless communication network 140 via the wireless signals 98 exchanged with the femto base station 120. Although shown as a mobile phone in FIG. 1B, the mobile device 130 may be another electronic device that may be moved about by a user and may be changeably located inside or outside of the structure 110. The mobile device 130 may also be referred to as a mobile station or a user equipment, and examples of the mobile device 130 include, but are not limited to, a mobile phone, a smartphone, a netbook, a laptop computer, a tablet or slate computer, an entertainment appliance, a navigation device, or combinations thereof. Claimed subject matter is not limited to a particular type, category, size, etc., of mobile device. During typical operation, the mobile device 130 may move frequently, and thus may not be stationary for a particular period of time. Further, in order to enable mobility, the mobile device 130 may be expected to be powered by a battery contained within the mobile device 130. The mobile device 130 may be plugged in to a power outlet to re-charge the battery but this may be for short and irregular time intervals.

The mobile device 132, which may be a second mobile device, may be structurally and functionally similar to the mobile device 130. The mobile device 132 may be the same type of device (e.g., a mobile phone) as the mobile device 130 or may be a different type of device than the mobile device 130. The mobile device 132 may be located outside of the first and/or second femtocells (i.e., outside of the transmission coverage area associated with the first femto base station and/or the second femto base station) and thus may not receive usable transmitted signals from the femto base station 120 and/or the femto base station 122.

A region outside of but proximate to one or more femtocells is referred to herein as a prediction region. A macrocell associated with the prediction region may or may not include any particular femtocells including the proximate femtocells. For example, referring to FIG. 1A, the prediction region 40 may be outside of the first femtocell 10 and the second femtocell 30 but within the macrocell 20. The prediction region 40 may include the location of the mobile device 132. The geometric area (e.g., an area measured in square meters) of the prediction region 40 may be equal to or on the order of the geometric area of either the first or the second femtocell.

Figure 2:
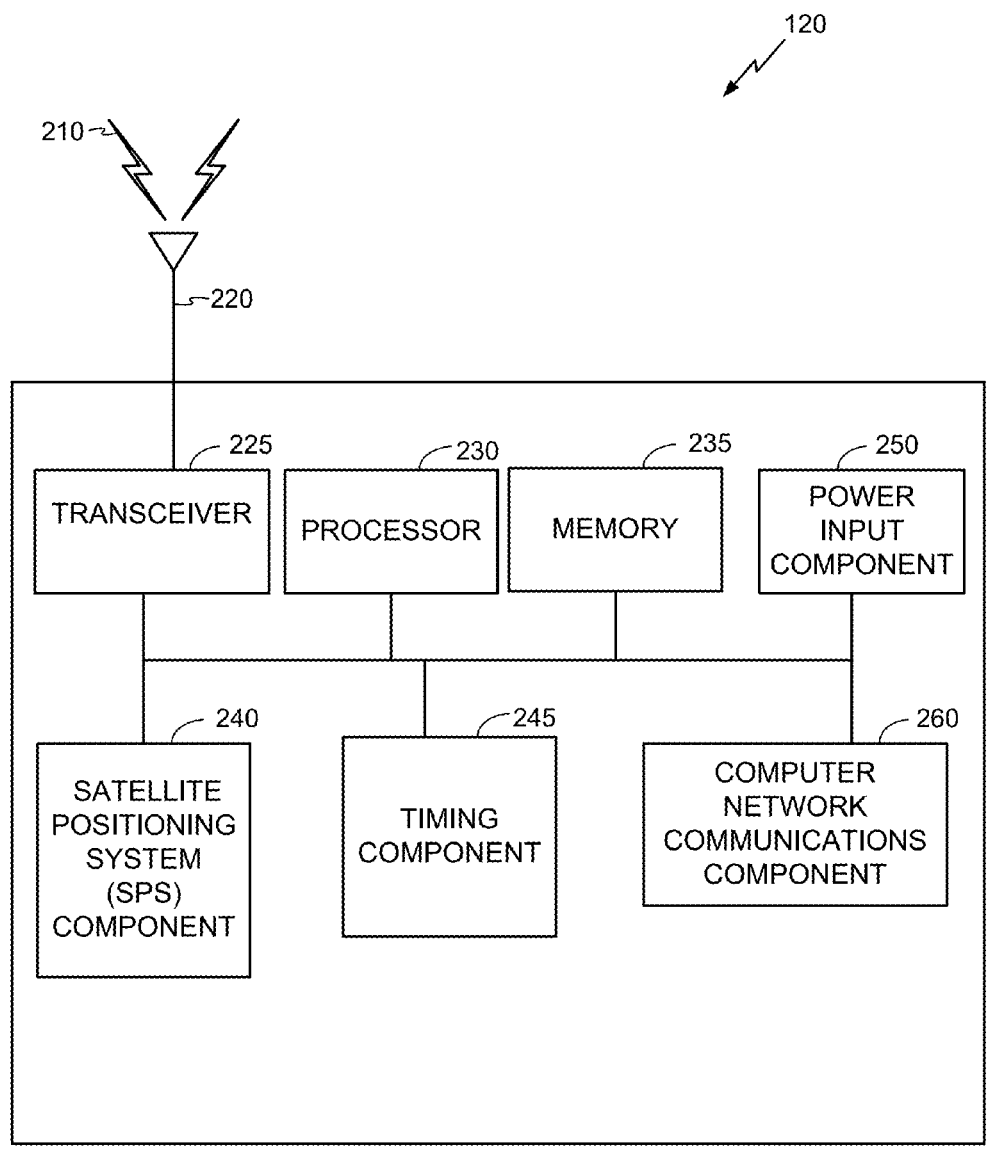
FIG. 2 is a block diagram of components of the femto base station shown in FIG. 1B.

Referring to FIG. 2, the femto base station 120 (and, similarly, the femto base station 122) includes an antenna 220, a transceiver 225, a processor 230, a memory 235, a satellite positioning system (SPS) component 240, a timing component 245, a power input component 250, and an computer network communications component 260. The femto base station 120 is an example and not limiting and may be altered, e.g., by having components added or removed. For example, while only one of each of the femto base station components 220, 225, 230, 235, 240, 250, 260 is shown in FIG. 2, more than one of any of these components could be part of the femto base station 120. The functionality of the femto base station is described below in the discussion of FIG. 3. The components 220, 225, 230, 235, 240, 245, 250, 260 are communicatively coupled (directly and/or indirectly) to each other for bi-directional communication. Although shown as separate entities in FIG. 2, the components 225, 240, 245, 260 may be part of the processor 230. The power input component 250 includes appropriate hardware to provide power to the femto base station 120, for example, via the wired connection 192 between the femto base station 120 and the AC power outlet 105 as shown in FIG. 1B, via a battery or other DC power source, via an inductive power transfer device, etc. The computer network component 260 may include appropriate hardware, including one or more processors (not shown), to couple to and communicate with the core network 145 via the communicative connection 196 between the femto base station 120 and the core network access device. The component 260 may include a network interface card (NIC) to enable IP communication. The SPS component 240 is configured to communicate with the transceiver 225 and the processor 230 to process the received SPS signals 90 and to obtain the SPS-based location of the femto base station 120. An example of the femto base station 120 may not include the SPS component 240 and/or the SPS module 340 (as described below) or may not otherwise be enabled, either permanently or temporarily, to determine an SPS based position. In this case, terrestrial downlink positioning (TDP) may be used to determine the location of the femto base station 120 (i.e., a TDP-based position). Based on a time-of-arrival and/or time-difference-of-arrival of downlink signals from multiple neighboring macro base stations at known locations, the TDP-based location may be determined at the femto base station (e.g., by the processor 230) and/or at the positioning server 170 and/or other network entity. The TDP-based position may be stored at the femto base station, for example in the memory 235.

The transceiver 225 is configured to send and receive wireless signals 210 (e.g., RF signals) via the antenna 220. The transceiver 225 may include one or more processors configured to cause the transceiver 225 to send and receive the wireless signals 210. The wireless signals 210 may include signals in multiple frequency bands, for example, SPS signals 90 and/or wireless network signals 92. The antenna 220 may include separate antennas for receiving SPS signals 90 and wireless network signals 92. The antenna for receiving SPS signals 90 may be, for example, a dedicated SPS antenna which may be included in the transceiver 225 or an SPS receiver (not shown). The dedicated SPS antenna may be, for example, a patch antenna equivalently referred to as a microstrip antenna. In order to operate in multiple receiver modes, with each mode configured to process signals in a particular frequency band, the transceiver 225 may include multiple receiver chains. The receiver chains may be configured to multiplex (i.e., switch quickly back and forth) between the multiple receiver modes. The multiple receiver modes may include, for example, an SPS mode and a wireless network mode. Alternatively, the transceiver 225 may be configured to diplex or triplex in order to support receipt of signals over multiple air interfaces simultaneously. Further, the transceiver 225 may include multiple dedicated receivers, each dedicated receiver corresponding to a particular air interface.

A group delay may be associated with each receiver chain and may contribute to a signal time-of-arrival offset or error. The group delay describes a total signal processing time delay for a group of electronic signal processing hardware, firmware, and software associated with each receiver chain. This time delay is inherent to the electronic signal processing devices and associated firmware and software. A group delay difference between the group delay introduced by each signal receiver chain in determining time-of-arrival is a femto base station group delay offset value. For example, the femto base station group delay offset value may be the group delay difference between an SPS signal receiver chain and a wireless network signal receiver chain. Knowing the group delay offset value allows for the group delay to be compensated to improve synchronization of signal time-of-arrival determinations between modes of operation and to reduce signal time-of-arrival errors. Without signal time-of-arrival corrections based on the stored group delay offset value, uncorrected signal time-of-arrival error may result in an error in the range based positioning on the order of, for example, 1000 meters. The group delay offset value for the femto base station 120 may be determined and stored in the memory 235, e.g., at the time of manufacture of the femto base station 120. The femto base station group delay offset value is associated with a particular femto base station. For example, a first group delay offset value is associated with the first femto base station 120 and a second group delay offset value is associated with the second femto base station 122. The group delay offset value associated with each femto base station 120, 122 may be the same or may be different. It is believed that group delay offset values have intentionally not been determined and stored for femto base stations due to the relatively high expense of the group delay offset value determination procedure compared to the typical sale price of femto base stations. The group delay offset value determination procedure may be an undesirable operation for a femto base station manufacturer that typically will try to reduce (and resist additional) processes and time, and thus expense, to make femto base stations.

The timing component 245 may include one or more reference clocks (not shown) and may be a constituent component of the transceiver 225. The reference clocks can synchronize the timing of constituent electronic components of the components 225, 230, 240, 260 of the femto base station 120. The accuracy of the reference clocks may be about ±0.1 parts per million. Typically, the femto base station reference clocks are more stable than a mobile device clock due to the typical operational conditions of the mobile device (e.g., voice calls, power fluctuations, ambient temperature changes, etc.) that are not typical operational conditions for the femto base station. For example, the time uncertainty resulting from the mobile device clock instability may exceed the femto base station reference clock time uncertainty by a factor of 100. The SPS satellite signal information may also include a reference SPS time standard. Timing component 245 of the femto base station 120 may calibrate to or synchronize with the reference SPS time standard which may improve the accuracy of signal time-of-flight and other signal timing and/or location assistance information as determined by the femto base station 120. The reference SPS time standard may be received in real-time by the femto-base station and/or stored in the memory 235.

The processor 230 can be an intelligent hardware device, e.g., a central processing unit (CPU) such as those made by ARM®, INTEL® Corporation, or AMD®, a microcontroller, an application specific integrated circuit (ASIC), a general-purpose processor, a digital signal processor (DSP), a field programmable gate array (FPGA) or other programmable logic device, discrete gate or transistor logic, discrete hardware components, or any combination thereof designed to perform the functions described herein. A general-purpose processor may be a microprocessor, or in the alternative, any conventional processor, controller, microcontroller, or state machine. A processor may also be implemented as a combination of computing devices, e.g., a combination of DSP and a microprocessor, a plurality of microprocessors, one or more microprocessors in conjunction with a DSP core, or any other such configuration. The processor 230 may comprise multiple separate physical entities that can be distributed in the femto base station 120 and in particular in the transceiver 225, the SPS component 240, and/or the computer network component 260. The memory 235 refers generally to any type of computer storage medium, including but not limited to RAM, ROM, FLASH, disc drives, etc. The memory 235 may be long term, short term, and/or other memory associated with the femto base station 120 and is not limited to any particular type of memory or number of memories, or type of media upon which memory is stored. The memory 235 is a non-transitory processor-readable storage medium that stores processor-readable, processor-executable software code containing instructions that are configured to, when executed, cause the processor 230 to perform various functions described herein (although the description may refer only to the processor 230 performing the functions). Alternatively, the software code may not be directly executable by the processor 230 but configured to cause the processor 230, e.g., when compiled and executed, to perform the functions. The memory 235 can store information, including but not limited to information from the wireless signals 210.

Figure 3:
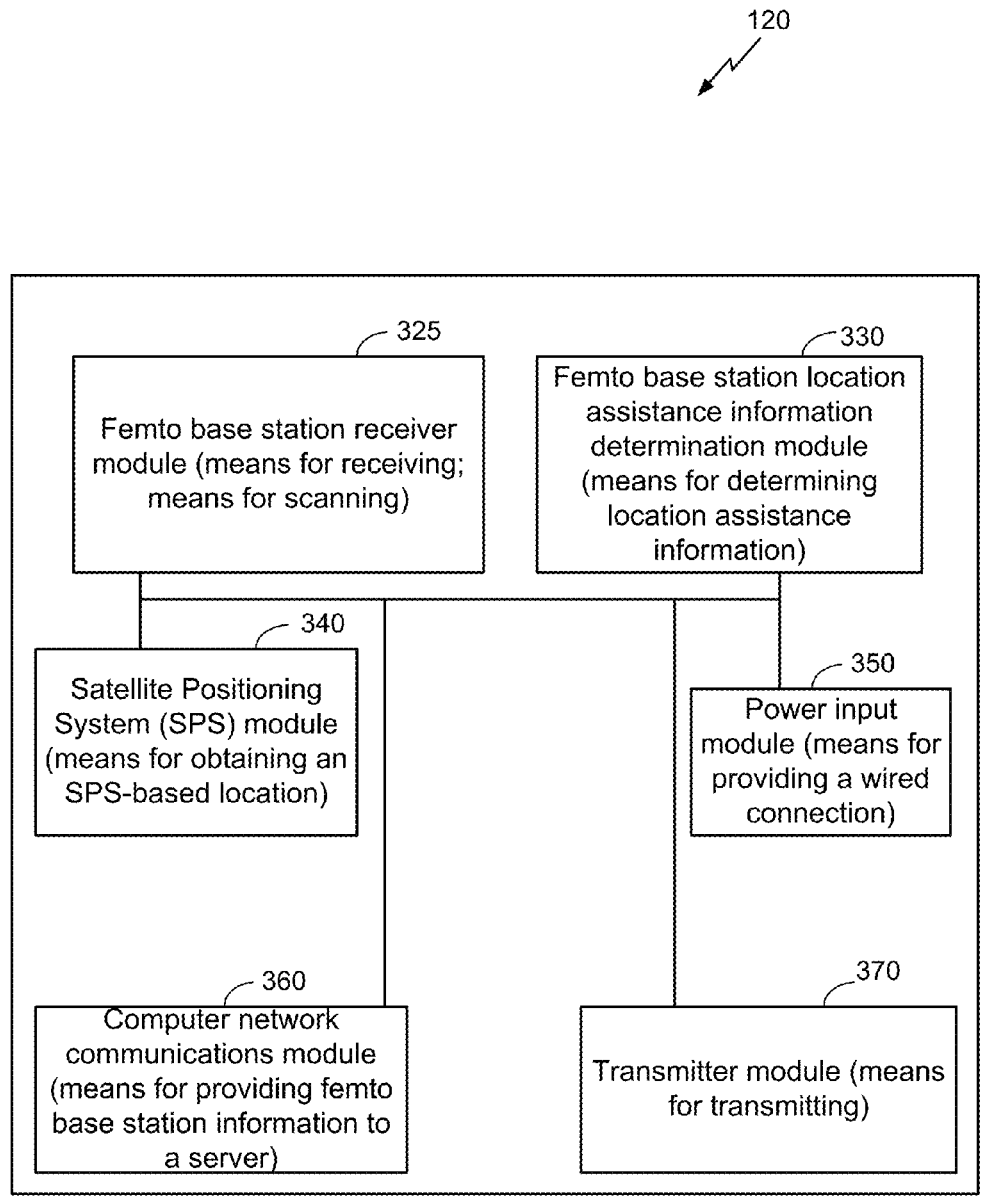
FIG. 3 is a functional block diagram of the components of the femto base station shown in FIG. 2.

Referring to FIG. 3, with further reference to FIGS. 1A-2, the femto base station 120 (and similarly the femto base station 122) includes a femto base station receiver module 325, a femto base station location assistance information determination module 330, an SPS module 340, a power input module 350, a computer network communications module 360, and a transmitter module 370. The modules 325, 330, 340, 350, 360, 370 are functional modules implemented by one or more of the components 225, 230, 235, 240, 245, 250, 260 of the femto base station 120. Thus, reference to any of the components 225, 230, 235, 240, 245, 250, 260 performing a function is equivalent to the respective module(s) 325, 330, 340, 350, 360, 370 performing the function. Similarly, reference to any of the modules 325, 330, 340, 350, 360, 370 performing or being configured to perform a function is shorthand for one or more, as appropriate, of the components 225, 230, 235, 240, 245, 250 260 performing or being configured to perform the function in accordance with software and/or hardware and/or firmware or combinations thereof.

The femto base station receiver module 325 (means for receiving; means for scanning) is configured to receive the macro base station signal transmitted from the macro base station (e.g., the macro base station 150). The femto base station receiver module 325 may integrate the macro base signals received at different arrival times. Signal integration may improve signal-to-noise ratios for the received signals. The received macro base station signal 92 may be the LRS. The femto base station receiver module 325 is further configured to scan (i.e., listen for signals of any of) multiple frequencies during one or more monitoring time periods in order to receive the LRS from the macro base station 150 without receiving the wireless network assistance signal (e.g., without receiving LRS assistance information from the wireless network including, for example, a transmission frequency, a transmission time, or any other indications regarding where to find the LRS from neighboring macro base stations in a range of frequencies and time). The macro base station signal received during a scan is identified by the femto base station receiver module 325 as the LRS based on a correlation between the received signal and stored LRS information (e.g., a bit pattern in the received signal matching a bit pattern stored, for example, in the memory 235). The monitoring time period is long relative to a transmission interval (i.e., a length of time during which the LRS is transmitted (e.g., intermittently such as periodically)) and may span one or more LRS transmission times (or time intervals). For example, the duration of the monitoring time period may be at least three minutes. Different monitoring time periods may be different with regard to commencement and/or duration. The femto base station 120 receiving power via the wired connection 192, as opposed to receiving power from a battery may prevent the scanning from adversely impacting other femto base station operations (e.g., available power and/or communications with the mobile device 130 and the wireless communication network 140 with respect to voice calls, data transfer, positioning, Internet access etc.).

During the one or more monitoring time periods, the femto base station 120 may be substantially stationary. This may reduce uncertainty in the signal time-of-flight determined based at least in part on the receiver position. For example, the femto base station 120 may be determined to be substantially stationary because the SPS-based or discovered location determined by and/or stored at the femto base station 120 and/or a server communicatively accessible to the femto base station 120 is substantially constant, at least within uncertainty estimates associated with the determined location. As a further example, the femto base station 120 may be determined to be substantially stationary based on the range of motion allowed by the wired connection 192 to the AC outlet and/or the wired connection 196 to the core network 145. Additionally or alternatively, the femto base station 120 may include a motion sensing device that may indicate motion and/or relocation of the femto base station 120

In an embodiment, the femto base station receiver module 325 may be configured to combine LRS signals. For example, the femto base station receiver module 325 may receive a first LRS transmitted at a first LRS transmission time and/or a first LRS frequency. The femto base station receiver module 325 may receive a second LRS transmitted at a second LRS transmission time and/or a second LRS frequency. The femto base station receiver module 325 may combine the first LRS and/or measurements thereof and the second LRS and/or measurements thereof and thereby determine a set of reference signal parameters from the combined first LRS and second LRS (i.e., a combined set of reference signal parameters associated with the first and the second LRS). For example, in the case of a periodic LRS signal such as the PRS or CRS, PRS or CRS measurements from different time epochs, during which the femto base station receiver module 325 is substantially stationary (i.e., in approximately the same location), could be combined to select a most reliable measurement or a most reliable combination of measurements. This could involve choosing a shortest path measurement or combining via the selection of a mean or median path or the elimination of outlier measurements. As a further example, the femto base station receiver module 325 may be configured to combine LRS fragments. For example, the LRS fragment may correspond to a portion of the LRS. As the portion of the LRS, the LRS fragment may indicate incomplete reference signal parameter information. For example, the LRS fragment may indicate less than all of bandwidth, configuration index, muting pattern, number of frames, macro base station cell identifier, macro base station signal power, duty cycle, and frequency list. The LRS fragment may be a result of, for example, the femto base station stopping a scan for the LRS during a transmission interval of the LRS, suppressed signal strength due to transmission channel noise or interference, or an incomplete LRS transmission from the macro base station. The femto base station receiver module 325 may receive a first LRS fragment transmitted at a first LRS transmission time and/or a first LRS frequency. The femto base station receiver module 325 may receive a second LRS fragment transmitted at a second LRS transmission time and/or a second LRS frequency. The femto base station receiver module 325 may combine the first LRS fragment or measurements thereof and the second LRS fragment and measurements thereof and thereby determine a set of reference signal parameters associated with the first and the second LRS fragments (i.e., a combined set of references signal parameters). The combined set of reference signal parameters may be a complete set of LRS information (i.e., the complete set of LRS information corresponds to the LRS information determined from an unfragmented LRS). Alternatively, the combined set of reference signal parameters may be a partial set of LRS information and may be further combined with additional received LRS and/or LRS fragments to determine a larger or complete set of LRS information. The LRS fragments may be received during one or more monitoring time periods.

Determining that the femto base station receiver module 325 is substantially stationary (i.e., in approximately the same location) can be achieved by comparing received signals against historically received signals for significant changes in strength and/or timing among the majority of signals. If a small minority of signals change, it could be caused by the removal or modification of signal sources, for example, the addition of a macrocell for a ball game and its removal after the game. New or possibly temporary signal sources may be flagged as temporary and ignored or assigned a weight of zero in any calculations. Determining whether a femto base station has been substantially stationary may also be done via a motion sensor or detector, such as through the use of a 3 dimensional accelerometer or a simple motion detector. If no motion is detected, the femto base station has been substantially stationary. However, if motion has been detected, the movement of the device may not be substantial (for example, moving a foot or two across a desk or windowsill). Thus, a combination of both motion sensors and signal measurements is the most reliable, where motion detection may be used to trigger a comparison of measured signals to historical signals to determine if there has been significant movement (i.e., movement greater than a predetermined threshold. The measurements and the threshold(s) could be distance, timing or signal strength based). Historical baseline signal measurements may be stored and, in some embodiments, modified or updated over time. For example, if the majority of the signals remain approximately the same (within a threshold from historical values) but a single signal or a minority of signals changes, in conjunction with a determination of no significant movement, the baseline or historical signal values for the signal sources associated with the changed signals may be updated.

The SPS module 340 (means for obtaining an SPS-based location) is configured to determine an SPS-based location of the femto base station 120 along with an error estimate associated with the SPS-based location. The SPS module 340 is configured to process SPS satellite signal information (e.g., information received via the SPS satellite signals 90) and other information, as appropriate, to determine the SPS-based location of the femto base station 120. The SPS module 340 is configured to obtain the SPS-based location each time the femto base station 120 is powered on, e.g., in response to plugging in the femto base station 120. The obtained SPS location of the femto base station 120 (i.e., the receiver position) may remain constant over the time during which the femto base station is stationary.

The power input module 350 (means for providing a wired connection) is configured to provide power to the femto base station 120 via the wired connection 192 to the AC power outlet 105. Plugging in the femto base station 120 can establish the wired connection 192. The power input module 350 may be configured to provide power to the femto base station 120 via a battery or other DC power source, via an inductive power transfer device, etc.

The femto base station location assistance information determination module 330 (means for determining location assistance information; means for obtaining location assistance information) is configured to determine and/or obtain the location assistance information based at least in part on the received macro base station signals 92. For example, the module 330 may determine the location assistance information using the signal processing hardware and software included in the femto base station 120 (e.g., the components discussed above with regard to FIG. 2 along with signal processing algorithms and/or location assistance information determination algorithms stored in the memory 235 and executed by the processor 230). Determining location assistance information at the femto base stations 120 may reduce bandwidth allocation by the wireless communication network 140 as compared to collection of location assistance information at a network server via mobile device crowdsourcing.

The determined location assistance information is based on the macro base station signals received at the femto base station receiver module 325. For example, each received macro base station signal corresponds to a particular signal power, signal time-of-arrival and signal time-of-transmission. The module 330 may measure and/or integrate the signal strength or power of one or more received macro base stations signal to determine the RSSI. The module 330 may determine the signal time-of-arrival (e.g., using the timing component 245) and may correct or adjust the time-of-arrival using the femto base station group delay offset value, described above, to subtract or otherwise eliminate the impact of the group delay offset value from the measured time of arrival. The module 330 may determine the time-of-transmission (e.g., using a time stamp encoded and transmitted in the macro base station signal) and may correct or adjust the time-of-transmission using the time-of-transmission offset, described in more detail below. The time-of-arrival and time-of-transmission indicate the signal time-of-flight which indicates the signal path length.

The module 330 may determine the multipath effect based on the signal path length indicated by the time-of-flight. Multipath may be detected via the detection of multiple signal peaks or by the reception of a given signal at varying offsets. Multipath may also be indicated through the detection of signal strength that is significantly weaker than anticipated or by signal delay that is significantly greater than anticipated, based on the distance between the macro base station and the measuring femto base station. Signal time-of-flight and signal path length for received signals may be compared to expected received signals as determined by theoretical and/or empirical models. For example, the femto base station location information and the known location of the macro base station may indicate a distance or length of a straight line path between the transmitter and receiver (e.g., the length of the straight line path may indicate the path length of an unscattered transmitted signal). The module 330 may determine a contribution of multipath scattering to noise or spread in the determined signal time-of-arrival, signal time-of-flight, and/or signal path length. The multipath effect may be measured or inferred by comparing signal correlation functions, for example, comparing a measured signal correlation function with a theoretical signal correlation function. The correlation function may indicate a degree of agreement between the received signal and an expected or desired received signal. For example, signal timing (e.g., signal time-of-arrival and/or signal time-of-flight) and/or signal path length as determined from a particular received signal may be compared via the correlation function to signal timing and/or signal path length as determined from one or more additional received signals. Various algorithms including, for example, but not limited to, a maximum likelihood algorithm may be used to discover the multipath effect on the signal path length and on the signal time-of-flight based on the signal correlation functions. Due to the small area of the femtocell, as compared to the macrocell, the multipath effect may be assumed to be constant within the femtocell. Because the signal path length differences produced by features within the femtocell (e.g., walls, furniture, etc.) are negligible in comparison to the signal path length differences produced by the terrain features of the macrocell (e.g., mountains, buildings, etc.), a same multipath effect determination may be used in mobile device location determination calculations for any mobile device location within the femtocell.

The module 330 may determine the time-of-transmission offset by comparing an absolute time-of-transmission to a time stamp included in the macro base station signal 92. The absolute time-of-transmission is the time at which the macro base station 150 transmits the macro base station signal 92. The absolute time-of-transmission is determined based on a difference between a signal time-of-arrival and a signal time-of-flight. The signal time-of arrival is the time at which the femto base station 120 receives the macro base station signal 92 as determined, for example, with respect to the reference SPS time standard. The reference clocks of the timing component 245 can indicate the signal time-of-arrival. The indicated signal time-of-arrival may be corrected or adjusted based on the stored group delay offset value. The signal time-of-flight may be determined from the known location of the femto base station and a known location of the macro base station. Since the time-of-transmission offset associated with a particular macro base station is constant throughout the associated macrocell, the time-of-transmission offset is also constant throughout the femtocell for macro base station signals received from the particular macro base station.

If the macro base station signal 92 is the LRS (e.g., the LTE (PRS) and/or the LTE (CRS)), the location assistance information determined from the macro base station signal 92 may include reference signal parameters such as bandwidth, configuration index, muting pattern, number of frames, macro base station cell identifier, macro base station signal power, duty cycle, and frequency list. The module 330 may determine the reference signal parameters based on the received LRS.

Alternatively or additionally, the module 330 may obtain location assistance information determined at a server, for example, the positioning server 170. As discussed in more detail below, the server 170 may determine the location assistance information based on the provided femto base station information (e.g., using signal processing hardware and software included in the server 170). The server 170 may then provide the determined location assistance information to the femto base station 120. The module 330 is further configured to store the location assistance information in the memory 235.

It has been discovered that the association of the stationary femto base station with the femto base station group delay offset value and with multipath effect and time-of-transmission offset that are constant throughout the femtocell, increases location assistance information accuracy. Further, this association simplifies location assistance information determination based on the signals received and collected by the femto base station as compared to location assistance information determination based on mobile device crowdsourcing data. For the stationary femto base station, uncertainties associated with the receiver position may be reduced which may further improve location assistance information accuracy. Further, by collecting information for signals received from multiple macro base stations on a femto base station neighbor list, the location assistance information determined from these received signals provides signal channel profiles associated with the various macro base stations. The profiles (i.e., the sets of location assistance information, each set associated with a particular macro base station as determined based on signals received at a particular femto base station) may be provided to mobile devices and/or positioning servers for use in calculating or determining the mobile device location from the macro base station signals. The use of such profiles may improve range based terrestrial positioning.

The module 330 may be configured to update location assistance information. For example, the module 330 may replace all or selected portions of previously determined and/or stored location assistance information (e.g., stored in the memory 235 and/or the server memory 174) with location assistance information determined in a subsequent and/or current time period. For example, the reference signal parameters may change over time due to changes and/or adjustments in these parameters by the wireless communication network 140. The changes and/or adjustments may be due to, for example, wireless network hardware and/or software changes. As a further example, RSSI, time-of-transmission offset, and/or multipath effect determinations may change in a subsequent and/or current time period. For example, the previously determined location assistance information may correspond to a time period characterized by wireless network signal anomalies, malfunctioning network hardware and/or software, and/or other undesired events or conditions. Alternatively or additionally, changes affecting the signal characteristics in the macrocell (e.g., structural and/or configurational changes such as demolition and/or construction of a building, demolition and/or construction of a terrain feature such as a hill or wall, etc.) and/or changes affecting the signal characteristics in the femtocell (e.g., structural and/or configurational changes such as furniture arrangement, remodeling, replacement of materials, etc.) may render the previously determined location assistance information invalid and/or outdated. To reflect these changes and update the outdated and previously determined and/or stored location assistance information, the module 330 may replace the previously determined location assistance information with subsequently and/or currently determined location assistance information.

The module 330 may be further configured to collect and statistically analyze location assistance information determined over multiple monitoring time periods and/or multiple received macro base station signals. For example, a first RSSI, first time-of-transmission offset, and/or first multipath effect may be determined based on a first received macro base station signal or a first group of received macro base station signals. A second RSSI, second time-of-transmission offset, and/or second multipath effect may be determined based on a second received macro base station signal or a second group of received macro base station signals. The second received signal or group may correspond to a different transmitted signal(s) (e.g., a second transmitted macro base station signal or group of signals) than the first received signal or group. The first transmitted macro base station signal and the second transmitted macro base station signal may be transmitted by the same macro base station (e.g., the first macro base station 150) or by different macro base stations. The first received macro base station signal and the second received macro base station signal may be received during the same monitoring time period (i.e., a first monitoring time period). Alternatively, the first received macro base station signal may be received during the first monitoring time period and the second macro base station signal may be received during a second monitoring time period. The second monitoring time period may be different from the first monitoring time period with respect to commencement; the second monitoring time period may be the same as or different from the first monitoring time period, for example, with respect to duration. The module 330 may determine statistical indicators (e.g., minima, maxima, a range, a variance, a standard deviation, a mean, a median, a distribution, a skewness, etc.) for the RSSI, the time-of-transmission offset, the multipath effect, or other location assistance information associated with the multiple transmitted and received macro base station signals and/or the multiple monitoring time periods. The module 330 may store determined statistical indicators in the memory 235. Collection and statistical analysis of the location assistance information over multiple macro base station signals and/or multiple monitoring time periods may allow for characterization of, for example, effects of various network hardware components (e.g., antenna orientations, directionality, type, etc.), effects of network hardware configurations (e.g., spatial configurations affecting distances between receivers and transmitters and/or affecting signal scattering), temporal effects (e.g., duration of the monitoring time period, time of day, season, etc.), interference fluctuations (e.g., interference due to other radio signal devices), human effects (e.g., presence, absence, orientation, mobility, etc.), and environmental effects (building structure and/or materials, terrain, etc.) on channel conditions and on the determined location assistance information. Further, such statistical analysis may indicate the reliability of such information and may allow the determination of correlations between particular network conditions and particular determined location assistance information. Such correlations may be stored so that location assistance information may be selectively provided to the mobile device. For example, a determined correlation between a particular set of location assistance information and a particular set of conditions and/or time period (e.g., day-time hours, night-time hours, weekdays, weekends, winter, summer, doors and/or windows open or closed, volume of network traffic, etc.) may enable the particular set of location assistance information to be provided to the mobile device in the presence of the particular conditions and/or during the particular time period.

The computer network communications module 360 (means for providing femto base station information) is configured to provide bi-directional communication between the femto base station 120 and server 170 via the core network 145 and the communicative connection 196. The module 360 may provide femto base station information to the positioning server 170. The femto base station information may include location assistance information determined at the femto base station, femto base station location information, received signal information (e.g., phase, power, etc.), and/or timing information (e.g., signal time-of-arrival, signal time-of transmission, signal time stamp, the reference SPS time standard, the group delay offset value, etc.).

The transmitter module 370 (means for transmitting) is configured to transmit the determined location assistance information, via radio signals, to the mobile device 130 located in the femtocell of the femto base station 120. The transmitted location assistance information may further include the femto base station location information.

Figure 4:
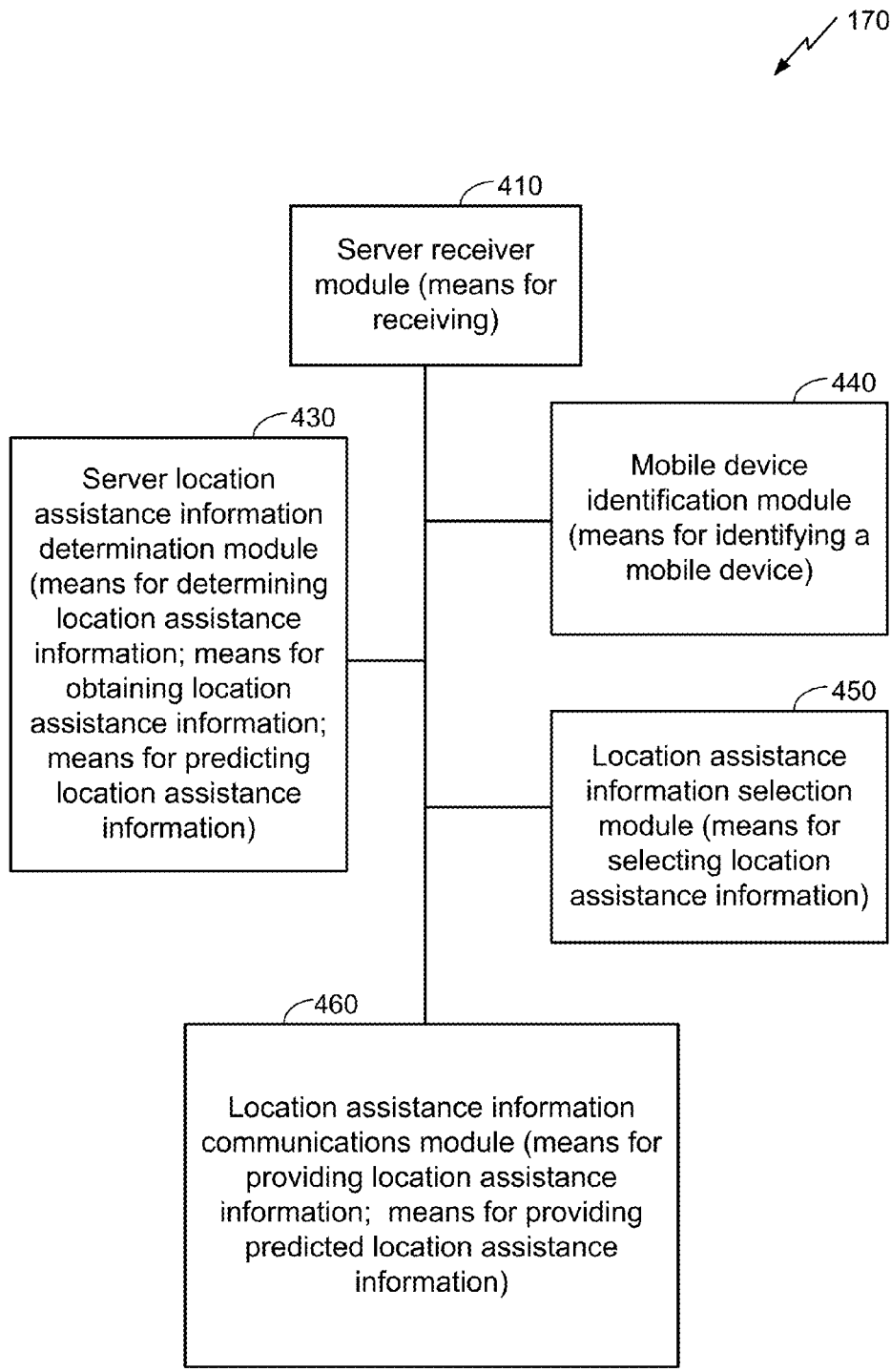
FIG. 4 is a functional block diagram of components of the positioning server shown in FIG. 1B.

Referring to FIG. 4, with further reference to FIGS. 1A-3, the positioning server 170 includes a server receiver module 410, a server location assistance information determination module 430, a mobile device identification module 440, a location assistance information selection module 450, and a location assistance information communications module 460. The modules 410, 430, 440, 450, and 460 are functional modules implemented by the server processor 172, the server memory 174, and/or the network interface 176 of the positioning server 170. Thus, reference to any of the server processor 172, the server memory 174, or the network interface 176 performing a function is equivalent to the respective functional module(s) 410, 430, 440, 450, 460 performing the function. Similarly, reference to any of the modules 410, 430, 440, 450, 460 performing or being configured to perform a function is shorthand for one or more, as appropriate, of the server processor 172 or the server memory 174 performing or being configured to perform the function in accordance with software and/or hardware and/or firmware or any combination thereof.

The server receiver module 410 (means for receiving) is configured to receive femto base station information from the femto base station (e.g., femto base stations 120 and/or 122). The module 410 is configured to receive the femto base station information via the wireless network portion of the core network 145. The server receiver module 410 may receive first femto base station information from the first femto base station 120 and may receive second femto base station information from the second femto base station 122. The first femto base station information and the second femto base station information may both be based on macro base station signals received from the same macro base station. Alternatively, the first femto base station information may be based on macro base station signals received from a first macro base station and the second femto base station information may be based on macro base station signals received from a second macro base station, the second macro base station being different from the first macro base station. The femto base station information may include, but is not limited to, the location assistance information determined at the femto base station, femto base station location information, received signal information (e.g., phase, power, etc.), and timing information (e.g., signal time-of-arrival, signal time-of transmission, signal time stamp, the reference SPS time standard, the group delay offset value associated with the femto base station, etc.). The module 410 is further configured to receive, from the mobile device (e.g., mobile devices 130 and/or 132), a location assistance information request (e.g., a first location assistance information request from a first mobile device and/or a second location assistance information request from a second mobile device) via the macro base station 150. The received location assistance information request may include mobile device identification information and location estimate information for the mobile device 130 including, for example, at least one of an SPS-based mobile device location, a wireless network-based mobile device location, one or more femto base station IDs, one or more macro base station IDs, etc. The server receiver module 410 is configured to communicate the received information to any or all of the modules 430, 440, 450, 460 and to store received information in the server memory 174 for use by any or all of the modules 430, 440, 450, 460.

The server location assistance information determination module 430 (means for determining location assistance information; means for obtaining location assistance information; means for predicting location assistance information) is configured to determine and/or obtain location assistance information based on the information received from at least one of the femto base stations 120, 122. For example, the femto base station information may include femto base station location information (e.g., the SPS-based position or the TDP-based position), received signal information (e.g., received signal phase information, received signal power information), and/or timing information (e.g., signal time-of-arrival, signal time-of transmission, signal time stamp, the reference SPS time standard, the femto base station group delay offset value, etc.). As similarly described in detail above with regard to the module 330, the determined and/or obtained location assistance information may include RSSI, time-of-transmission offset, multipath effect, updated location assistance information, and/or statistical indicators. The module 430 may determine the location assistance information using the signal processing hardware and software included in the positioning server 170 (e.g., the components discussed above with regard to FIG. 1B including signal processing algorithms and/or location assistance information determination algorithms stored in the server memory 174 and executed by the server processor 172). Alternatively or additionally, the module 430 may obtain location assistance information determined at the femto base station 120. As described above, the module 330 may determine the location assistance information and the module 360 may provide the determined location assistance information to the server 170.

The determination module 430 may be further configured to determine predicted location assistance information. The predicted location assistance information may predict or model signal characteristics for the prediction region described above with regard to FIG. 1B. For example, the determination module 430 may determine the predicted location assistance information based on the first femto base station information and/or the second femto base station information. For example, a predicted RSSI may be a function of the RSSI corresponding to the first and/or the second femto base station information (e.g., the predicted RSSI may be equal to or a percentage of a first RSSI indicated by the first femto base station information, equal to or a percentage of a second RSSI indicated by the second femto base station information, an average or weighted average of the first and second RSSIs, etc.). In other examples, a predicted time-of-transmission offset may be a function of the time-of-transmission offsets corresponding to the first and/or the second femto base stations (e.g., the time-of-transmission offset may be equal to or a percentage of either the first or the second femto base stations or may be an average, weighted average of both time-of-transmission offsets). A predicted multipath effect may be the multipath effect determination for the first or the second femto base station information or may be a function of the multipath effect determination for the first and the second base station information. The predicted multipath effect determination may be based on an assumption that femtocell contributions to the multipath effect are negligible compared to the macrocell contributions and, therefore, that the multipath effect determined for a particular femtocell within a particular macrocell may be applied to the prediction region inside the particular macrocell. For example, referring to FIG. 1A, the multipath effect determination for the femtocell 10 within the macrocell 20 may be applied to the prediction region 40, also within the macrocell 20. The predicted multipath effect determination may also be based on an assumption that femtocell contributions from the first femtocell 10 and/or the second femtocell 30 are substantially equivalent to multipath effect contributions of the prediction region 40. Predicted reference signal parameters may be the reference signal parameters determined for the first and/or the second femto base station information. For example, referring again to FIG. 1A, if the prediction region 40 is within or proximate to a macrocell 20 including the first femtocell 10, then the predicted reference signal parameters may be the reference signal parameters determined for signals 92 transmitted by the macro base station 150 associated with the macrocell 20. The predicted location assistance information may include statistical indicators (e.g., minima, maxima, a range, a variance, a standard deviation, a mean, a median, a distribution, a skewness, etc.) based on the first location assistance information and/or the second location assistance information. The predicted location assistance information may improve the mobile device position determination accuracy for the mobile device 132 in the prediction region 40 and the statistical indicators may allow the mobile device 132 to determine the reliability of the predicted location assistance information with regard to location determination accuracy.

The module 430 may be further configured to compare the time-of-transmission offset and the multipath effect determination location assistance information corresponding to the first location assistance information of the first femto base station 120 and the second location assistance information corresponding to the second femto base station 122. Comparing may include determining similarities, equivalences, differences, etc. between the time-of-transmission offsets and the multipath effect determinations and/or associated statistical indicators for the two sets of location assistance information. The comparison may indicate or clarify a distinction between the effects of time-of-transmission offset and the multipath effect on the signal time-of-arrival, time-of-transmission, and/or signal path length. For example, the first location assistance information and the second location assistance information may be determined from signals transmitted from the same macro base station 150 but received at different femto base stations 120,122 (e.g., the first location assistance information based on the first transmitted signal received at the first femto base station and the second location assistance information based on the second transmitted signal received at the second femto base station). In this case, since the first and the second signals are transmitted by the same macro base station, the same time-of-transmission offset may be associated with both signals. However, due to the geographic separation between the first femto base station 120 and the second femto base station 122, the multipath effect may be different for the two signals.

The mobile device identification module 440 (means for identifying a mobile device) is configured to identify one or more mobile devices to which the server may provide location assistance information. For example, the module 440 may identify the mobile device 130 based on the location assistance information request received from the mobile device 130 by the server receiver module 410. The location assistance information request indicates to the module 440 that the particular mobile device is to be provided with the location assistance information. Alternatively or additionally, the module 440 may identify one or more mobile devices based on any determined and/or received indication (e.g., from another network entity, another mobile device, an emergency service provider etc.) that a particular mobile device is to be provided with location assistance information. The identification of the mobile device may further be based on a location estimate of one or more mobile devices. For example, the module 440 may identify all or a portion of mobile devices estimated to be located in a particular area (e.g., in or near a particular femtocell or macrocell) as devices to which the server may provide the location assistance information. The location estimate may be based on a wireless network provided mobile device location estimate, a previously stored mobile device location information, a femto base station access list, location, or identification, a macro base station access list, location, or identification, and/or or other information indicative of the estimated mobile device location and/or the association of the particular mobile device with a particular femto base station and femtocell.

The location assistance information selection module 450 (means for selecting location assistance information) is configured to select location assistance information corresponding to the identified mobile device. The selected location assistance information may include the determined location assistance information, the predicted location assistance information, the updated location assistance information and/or the statistical indicator associated with the location assistance information. Based on a correspondence between the mobile device location estimate information and a particular femto base station, the module 450 may select a particular set of location assistance information associated with the particular femto base station. For example, the mobile device location estimate for the mobile device 130 may correspond to the macrocell, the femtocell, and/or the geographic location associated with the femto base station 120 and/or the macro base station 150. Accordingly, the module 450 may select location assistance information determined by the module 430 based on signals transmitted from the macro base station 150 as received by the femto base station 120. As a further example, the mobile device location estimate for the mobile device 132 may correspond to the prediction region associated with the macro base station 150 but not associated with femto base stations 120, 122. Accordingly, the module 450 may select predicted location assistance information determined based on the femto base station information determined by and/or received from the one or more femto base stations proximate to the prediction region.

The location assistance information communications module 460 (means for providing location assistance information; means for providing predicted location assistance information) is configured to provide (e.g., transmit or send via the wireless communication network 140 and/or via the core network 145) the selected location assistance information to the mobile devices, for example but not limited to, the identified mobile devices. For example, the module 460 may provide the selected location assistance information corresponding to the femto base station 120 to the mobile device 130. As further examples, the module 460 may provide the predicted location assistance information, the updated location assistance information, and/or the statistical indicators associated with the location assistance information to the mobile device 132. The module 460 may be further configured to provide the selected location assistance information to the femto base stations 120, 122.

Figure 5:
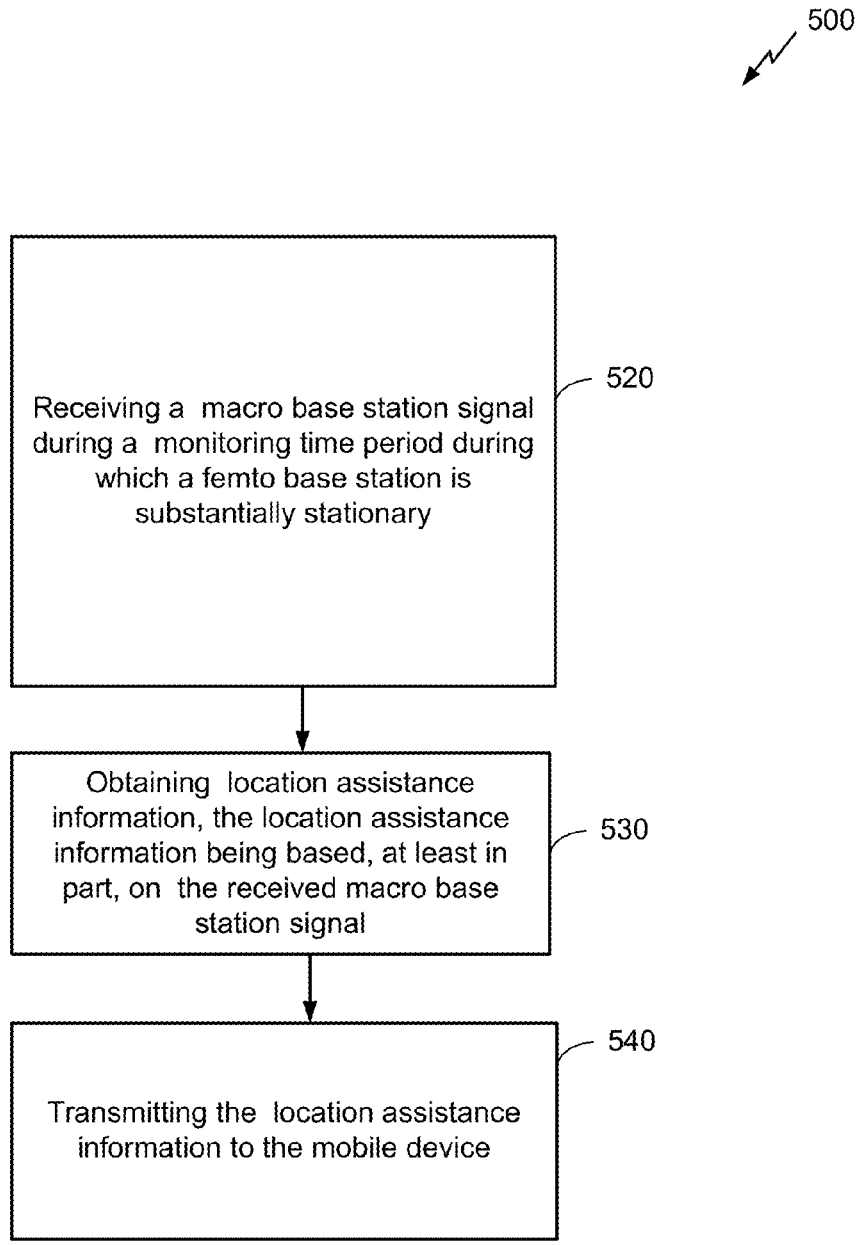
FIG. 5 is a block flow diagram of a method for providing location assistance information by the femto base station shown in FIG. 1B.

Referring to FIG. 5, with further reference to FIGS. 1A-4, a method 500 for providing location assistance information from a femto base station to a mobile device is shown. For example, the location assistance information is transmitted by the femto base station 120 to the mobile device 130. The method 500 is, however, an example only, and not limiting. The method 500 can be altered, e.g., by having stages added, removed, rearranged, combined, and/or performed concurrently.

At stage 520, the method 500 includes receiving a macro base station signal during a monitoring time period during which a femto base station is substantially stationary. For example, the macro base station signal 92 (e.g., a first macro base station signal) is transmitted by the macro base station 150 and is received at the femto base station receiver module 325. Receiving the macro base station signal may include receiving the LRS and may further include scanning for the LRS. Scanning for the LRS, as discussed above with regard to the femto base station receiver module 325, includes monitoring multiple frequencies over one or more monitoring time periods in order to find the LRS in frequency and time. Optionally, at stage 520, the method 500 includes integrating received macro base station signals, as discussed above with regard to the module 325, and/or combining received signal fragments, as discussed above with regard to the module 330. Further, stage 520 may optionally include obtaining the femto base station location. For example, the SPS module 340 may obtain the SPS-based location in response to the femto base station 120 being powered on. As a further example, analysis of the time-of-arrival and/or time-difference-of-arrival of the macro base station signals received at stage 520 of the method 500 may determine a TDP-based location of the femto base station.

At stage 530, the method 500 includes obtaining location assistance information, the location assistance information being based, at least in part, on received the macro base station signal. For example, obtaining the location assistance information may include determining the location assistance information by the femto base station location assistance information determination module 330, as described above. The location assistance information may include LRS reference signal parameters, the RSSI, the time-of-transmission offset, and the multipath effect determination. As a further example, obtaining the location assistance information may include receiving location assistance information determined at the positioning server 170. The positioning server 170 may determine the location assistance information based, at least in part, on information provided from the femto base station and, in turn, may provide the determined location assistance information back to the femto base station 120. Optionally, at stage 530, the method 500 includes obtaining updated location assistance information and/or obtaining statistical indicators associated with the location assistance information. The updated location assistance information and/or the statistical indicators associated with the location assistance information may be determined at the femto base station 120, as described above with regard to the module 330. Alternatively or additionally, the updated location assistance information and/or the statistical indicators associated with the location assistance information may be determined at the positioning server 170 and provided to the femto base station, as described above with regard to the modules 430 and 460.

At stage 540, the method 500 includes transmitting the location assistance information to the mobile device. For example, the location assistance information is transmitted by the transmitter module 370 of the femto base station 120 to the mobile device 130 (e.g., not via the core network 145 and/or the macro base station 150). The mobile device 130 may be located within the femtocell associated with the femto base station 120. Optionally at stage 540, the method 500 includes providing the determined location assistance information to a server. For example, the information is provided by the computer network communications module 360 to the positioning server 170 via the communicative connection 196 to the core network 145.

Figure 6:
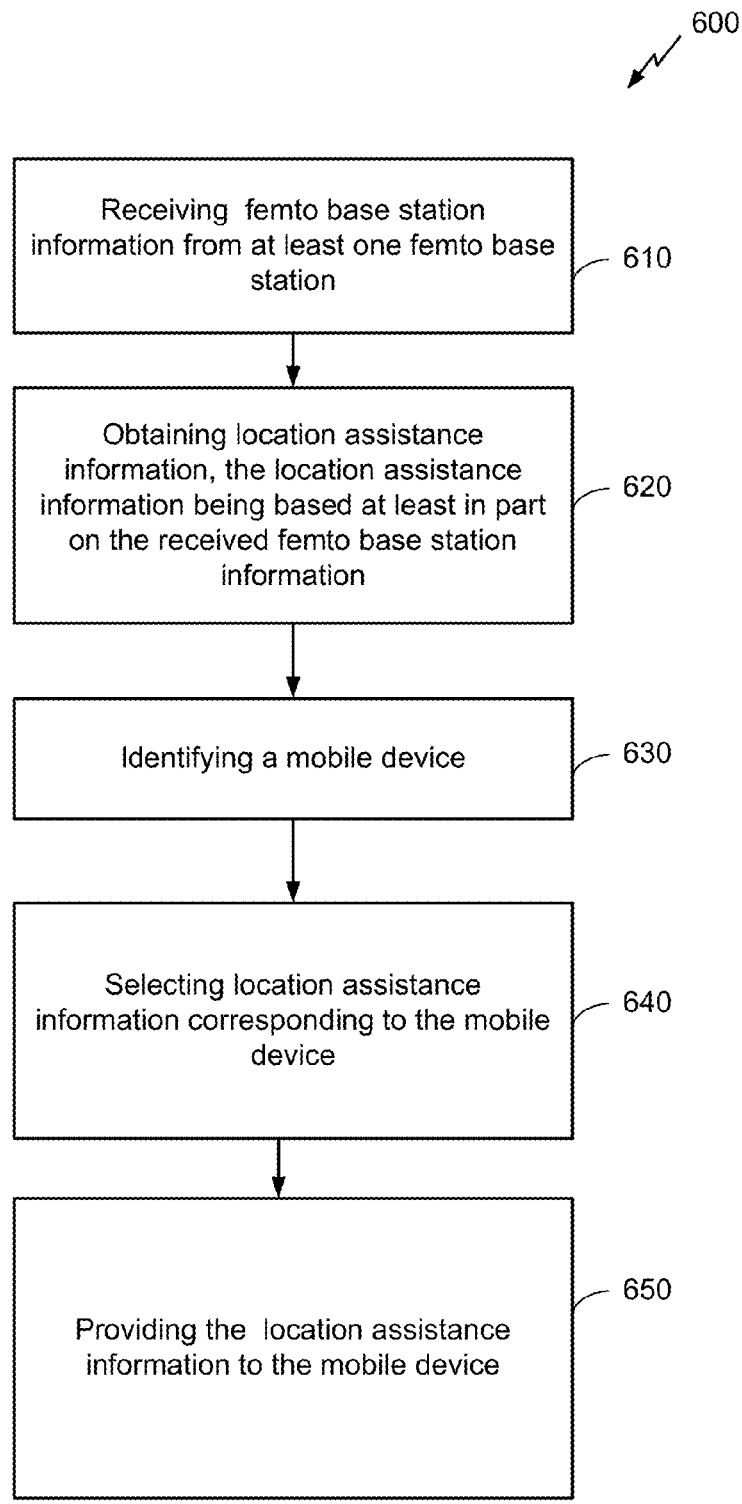
FIG. 6 is a block flow diagram of a method for providing location assistance information by the positioning server shown in FIG. 1B.

Referring to FIG. 6, with further reference to FIGS. 1A-5, a method 600 for providing location assistance information by a server to mobile device is shown. For example, the location assistance information is provided by the positioning server 170 to the mobile device 130. The method 600 is, however, an example only, and not limiting. The method 600 can be altered, e.g., by having stages added, removed, rearranged, combined, and/or performed concurrently.

At stage 610, the method 600 includes receiving femto base station information from at least one femto base station. For example, first femto base station information is received by the server receiver module 410 from the first femto base station 120 and/or second femto base station information is received by the server receiver module 410 from the second femto base station 122. The received femto base station information may include location assistance information determined by the femto base station (e.g., reference signal parameters, RSSI, time-of-transmission offset, and/or multipath effect) and/or femto base station location information (e.g., the SPS-based position and/or the TDP-based position), received signal information (e.g., phase, power, etc.) and/or timing information (e.g., signal time-of-arrival, signal time-of transmission, signal time stamp, the reference SPS time standard, and/or the group delay offset value associated with the femto base station). The stage 610 may further include receiving a location assistance information request from the mobile device 130 and/or 132. Optionally, at the stage 610, the method 600 includes storing the received femto base station information in the server memory, for example, server memory 174.

At stage 620, the method 600 includes obtaining location assistance information, the location assistance information being based at least in part on the received femto base station information. For example, obtaining the location assistance information may include determining the location assistance information by the server location assistance information determination module 430, as described above. The location assistance information may include LRS reference signal parameters, the RSSI, the time-of-transmission offset, and the multipath effect determination. Obtaining the location assistance information may further include determining predicted location assistance information by the server location assistance information determination module 430, as described above. As a further example, obtaining the location assistance information may include receiving location assistance information determined by at least one of the femto base stations 120, 122. The femto base stations 120,122 may determine the location assistance information based on macro base station signals received at the respective femto base station and may provide the determined location assistance information to the server 170. Optionally, at stage 620, the method 600 includes obtaining updated location assistance information and/or statistical indicators associated with the location assistance information. The updated location assistance information and/or the statistical indicators associated with the location assistance information may be determined at the femto base station 120, as described above with regard to the module 330, and/or at the positioning server 170, as described above with regard to the module 430.

At stage 630, the method 600 includes identifying a mobile device. For example, the mobile device identification module 440 may identify the mobile device to which the server may provide location assistance information (e.g., as described above with regard to the mobile device identification module 440). Identifying the mobile device may include identifying the mobile device based on the received location assistance information request. Identifying the mobile device may further include identifying the mobile device based on mobile device location estimate information. The location estimate information may be received by and/or determined by the positioning server 170.

At stage 640, the method 600 includes selecting location assistance information corresponding to the mobile device. The module 450 may select a particular set of location assistance information based on a correspondence between the mobile device location estimate information and a particular femto base station (e.g., as described above with regard to the location assistance information selection module 450).

At stage 650, the method 600 includes providing the location assistance information to the mobile device. The location assistance information communications module 460 may provide the selected location assistance information to the mobile devices 130, 132 (e.g., as described above with regard to the location assistance information communications module 460). The provided location assistance information may include predicted location assistance information.

Other Considerations

Other embodiments are within the scope and spirit of the invention. For example, due to the nature of software, functions described above can be implemented using software, hardware, firmware, hardwiring, or combinations of any of these. Features implementing functions may also be physically located at various locations, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media (e.g., a computer program product) might be involved in providing instructions/code to processor (s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

Information and signals may be represented using any of a variety of different technologies and techniques. For example, data, instructions, commands, information, signals, and symbols that may be referenced throughout the above description may be represented by voltages, currents, electromagnetic waves, magnetic fields or particles, optical fields or particles, or any combination thereof.

The methods, systems, and devices discussed above are examples. Various alternative configurations may omit, substitute, or add various procedures or components as appropriate. Configurations may be described as a process which is depicted as a flow diagram or block diagram. Although each may describe the operations as a sequential process, many of the operations can be performed in parallel or concurrently. In addition, the order of the operations may be rearranged. A process may have additional stages not included in the figure.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the disclosure. For example, the above elements may be components of a larger system, wherein other rules may take precedence over or otherwise modify the application of the invention. Also, a number of operations may be undertaken before, during, or after the above elements are considered. Also, technology evolves and, thus, many of the elements are examples and do not bound the scope of the disclosure or claims. Accordingly, the above description does not bound the scope of the claims. Further, more than one invention may be disclosed.

What is claimed is:

1. A method of providing location assistance information to a mobile device by a femto base station, the method comprising:
   receiving a macro base station signal during a monitoring time period during which the femto base station is substantially stationary;
   obtaining location assistance information, the location assistance information being based, at least in part, on the received macro base station signal and comprising at least one of a multipath effect determination or a time-of-transmission offset or a combination thereof wherein timing information associated with the femto base station is used in at least one of the multipath effect determination or the time-of-transmission offset or the combination thereof; and
   transmitting the location assistance information to the mobile device.

2. The method of claim 1 wherein the timing information associated with the femto base station is adjusted based on a femto base station group delay offset value, the femto base station group delay offset value being a group delay difference between signal receiver chains.

3. The method of claim 1 wherein receiving the macro base station signal comprises receiving a location reference signal (LRS) including at least one of a positioning reference signal (PRS) or a cell reference signal (CRS) or a combination thereof.

4. The method of claim 3 further comprising scanning over a plurality of frequencies during the monitoring time period.

5. The method of claim 3, the location assistance information further comprising one or more of bandwidth, configuration index, muting pattern, number of frames, macro base station cell identifier, macro base station signal power, duty cycle, or frequency list.

6. The method of claim 3 wherein receiving the LRS comprises: receiving a first LRS and a second LRS;
   combining the first LRS and the second LRS; and
   obtaining a set of reference signal parameters from the combined LRS.

7. The method of claim 6 wherein the first LRS is a first LRS fragment and the second LRS is a second LRS fragment.

8. The method of claim 1 wherein obtaining the location assistance information comprises:
   providing femto base station information to a server; and
   receiving the location assistance information, the location assistance information being based at least in part on the femto base station information.

9. The method of claim 1 wherein obtaining the location assistance information comprises determining the location assistance information at the femto base station.

10. A femto base station for providing location assistance information to a mobile device, the femto base station comprising:
    a transceiver configured to receive a macro base station signal;
    a memory; and
    a processor communicatively coupled to the transceiver and the memory and configured to obtain the location assistance information, the location assistance information being based, at least in part, on the received macro base station signal and comprising at least one of a multipath effect determination or a time-of-transmission offset or a combination thereof wherein timing information associated with the femto base station is used in at least one of the multipath effect determination or the time-of-transmission offset or the combination thereof;
    wherein the transceiver is further configured to transmit the location assistance information to the mobile device and further wherein the femto base station is substantially stationary.

11. The femto base station of claim 10 wherein the timing information associated with the femto base station is adjusted based on a femto base station group delay offset value, the femto base station group delay offset value being a group delay difference between signal receiver chains.

12. The femto base station of claim 10 wherein the transceiver is further configured to receive a location reference signal (LRS) including at least one of a positioning reference signal (PRS) or a cell reference signal (CRS) or a combination thereof.

13. The femto base station of claim 12 wherein the transceiver is further configured to scan over a plurality of frequencies during a monitoring time period during which the femto base station is substantially stationary.

14. The femto base station of claim 12, the location assistance information further comprising one or more of bandwidth, configuration index, muting pattern, number of frames, macro base station cell identifier, macro base station signal power, duty cycle, or frequency list.

15. The femto base station of claim 12 wherein the transceiver is further configured to:
 receive a first LRS and a second LRS;
 combine the first LRS and the second LRS; and
 obtain a set of reference signal parameters from the combined LRS.

16. The femto base station of claim 15 wherein the first LRS is a first LRS fragment and the second LRS is a second LRS fragment.

17. The femto base station of claim 10 wherein the processor is further configured to:
 provide femto base station information to a server; and
 receive the location assistance information, the location assistance information being based at least in part on the femto base station information.

18. The femto base station of claim 10 wherein the processor is further configured to determine the location assistance information at the femto base station.

19. A method of providing location assistance information from a server to a mobile device, the method comprising:
 receiving femto base station information from at least one femto base station;
 obtaining the location assistance information, the location assistance information being based at least on part on the received femto base station information and comprising at least one of a multipath effect determination or a time-of-transmission offset or a combination thereof wherein timing information associated with the at least one femto base station is used in at least one of the multipath effect determination or the time-of-transmission offset or the combination thereof;
 identifying the mobile device;
 selecting the location assistance information corresponding to the mobile device; and
 providing the location assistance information to the mobile device.

20. The method of claim 19 wherein the received femto base station information comprises one or more of femto base station location information, received signal phase information, received signal power information, a signal time-of-arrival, a signal time-of transmission, a signal time stamp, a reference SPS time standard, or a femto base station group delay offset value and further wherein obtaining the location assistance information comprises determining the location assistance information at the server.

21. The method of claim 19 wherein obtaining the location assistance information comprises determining predicted location assistance information, the method further comprising providing the predicted location assistance information to the mobile device.

22. The method of claim 19 wherein the location assistance information further comprises one or more of bandwidth, configuration index, muting pattern, number of frames, macro base station cell identifier, macro base station signal power, duty cycle, or frequency list.

23. A server for providing location assistance information to a mobile device, the server comprising:
 a memory;
 a network interface; and
 one or more processors coupled to the memory and to the network interface and configured to:
 receive femto base station information from at least one femto base station via the network interface;
 obtain the location assistance information, the location assistance information being based at least in part on the received femto base station information and comprising at least one of a multipath effect determination or a time-of-transmission offset or a combination thereof wherein timing information associated with the at least one femto base station is used in at least one of the multipath effect determination or the time-of-transmission offset or the combination thereof;
 identify the mobile device;
 select location assistance information corresponding to the mobile device; and
 provide the location assistance information to the mobile device.

24. The server of claim 23 wherein the received femto base station information comprises one or more of femto base station location information, received signal phase information, received signal power information, a signal time-of-arrival, a signal time-of-transmission, a signal time stamp, a reference SPS time standard, or a femto base station group delay offset value and further wherein obtaining the location assistance information comprises determining the location assistance information at the server.

25. The server of claim 23, the one or more processors further configured to:
 determine predicted location assistance information; and
 provide the predicted location assistance information to the mobile device.

26. The server of claim 23 wherein the location assistance information further comprises one or more of bandwidth, configuration index, muting pattern, number of frames, macro base station cell identifier, macro base station signal power, duty cycle, or frequency list.

* * * * *